(12) United States Patent
Bajwa

(10) Patent No.: US 7,774,109 B2
(45) Date of Patent: Aug. 10, 2010

(54) METHOD AND APPARATUS FOR MANAGING TORQUE INPUTS TO AN ELECTRO-MECHANICAL TRANSMISSION

(75) Inventor: Manpreet S. Bajwa, Windsor (CA)

(73) Assignee: GM Global Technology Operations, Inc., Detroit, MI (US)

( * ) Notice: Subject to any disclaimer, the term of this patent is extended or adjusted under 35 U.S.C. 154(b) by 330 days.

(21) Appl. No.: 11/858,105

(22) Filed: Sep. 19, 2007

(65) Prior Publication Data

US 2009/0076672 A1 Mar. 19, 2009

(51) Int. Cl.
G05D 3/00 (2006.01)
G06F 7/00 (2006.01)
G06F 17/00 (2006.01)

(52) U.S. Cl. .................. 701/22; 701/200; 701/201; 701/209; 180/65.275; 180/65.285

(58) Field of Classification Search ... 180/65.21–65.29, 180/65.275, 65.285; 701/200
See application file for complete search history.

(56) References Cited

U.S. PATENT DOCUMENTS

| 5,778,326 | A  | * | 7/1998 | Moroto et al. | 701/22 |
| 5,832,396 | A  | * | 11/1998 | Moroto et al. | 701/22 |
| 6,012,012 | A  | * | 1/2000 | Fleck et al. | 701/117 |
| 6,687,607 | B2 | * | 2/2004 | Graf et al. | 701/202 |
| 6,697,717 | B2 | * | 2/2004 | Shioda et al. | 701/22 |
| 6,856,866 | B2 | * | 2/2005 | Nakao | 701/22 |
| 2003/0009269 | A1 | * | 1/2003 | Graf et al. | 701/22 |
| 2005/0222724 | A1 | * | 10/2005 | Isono et al. | 701/36 |

* cited by examiner

*Primary Examiner*—Jack Keith
*Assistant Examiner*—Rami Khatib

(57) ABSTRACT

A hybrid-electric vehicle powertrain control is trained to predefined trips, enabling efficient use of torque events during such trips.

20 Claims, 3 Drawing Sheets

METHOD AND APPARATUS FOR MANAGING TORQUE INPUTS TO AN ELECTRO-MECHANICAL TRANSMISSION

TECHNICAL FIELD

This disclosure is related to control of electro-mechanical powertrain systems.

BACKGROUND

The statements in this section merely provide background information related to the present disclosure and may not constitute prior art.

Powertrain architectures comprise torque-generative devices, including internal combustion engines and electric machines, which transmit torque through a transmission device to a vehicle driveline. Such powertrain systems include parallel-hybrid systems and compound-split hybrid systems, wherein tractive torque to one or more wheels is generated by the internal combustion engine, the electric machine, or a combination thereof through a transmission device. Such systems typically include an electric power system operative to generate and transmit torque through the transmission, and comprise the electric machine and an electrical energy storage device (ESD) operatively connected via power electronics devices. The electric machine comprises a motor/generator operable to generate tractive torque for input to the transmission, independently of torque input from the internal combustion engine. The electric machine is operable to transform vehicle kinetic energy, transmitted through the vehicle driveline, to electrical energy potential that is storable in the ESD. A control system monitors various inputs from the vehicle and the operator and provides operational control of the powertrain system, including controlling transmission gear shifting, controlling the torque-generative devices, and regulating the electrical power interchange between the ESD and the electric machine.

A primary motivation for using a hybrid powertrain system is to improve vehicle fuel economy by utilizing the electric machine to generate some or all of the tractive torque in response to specific operator torque requests, e.g., acceleration events, thus reducing fuel consumption. Furthermore, vehicle kinetic energy can be used to generate electrical energy during vehicle operation such as braking events, thus recharging an electric storage device, commonly a battery.

One operating parameter for a hybrid powertrain system is state of charge (SOC) of the ESD, which is a known parameter that is readily determinable. It is preferable to maintain the SOC of the ESD within a range of values, to optimize service life of the ESD, and prevent damage due to overcharging and excessive discharging.

Vehicle operators often follow a predictable set route to achieve a destination. Examples of this include driving between a place of residence to and from a place of work. Other routes include, e.g., to school, or to a shopping facility. Each set route can be characterized in terms of total distance traveled, operator braking events occurring at specific distances, and operator torque requests.

It would be advantageous to use characteristics of a specific set driving route to manage operation of a hybrid powertrain system to optimize fuel economy and reduce fuel consumption. Such a system is described hereinafter.

SUMMARY

A powertrain includes an internal combustion engine and an electric machine coupled to an electro-mechanical transmission to transmit mechanical power to a driveline. Electric power flows between the electric machine and an energy storage system. Control of the powertrain includes determining the occurrence of a pre-defined trip. Operator torque requests, operator braking requests, and energy storage system state of charge are monitored. A projected gain in the state of charge of the energy storage system for a braking event occurring during the pre-defined trip is determined. Torque output from the electric machine based upon the projected gain in the state of charge of the energy storage system for the braking event is also determined. Torque outputs from the electric machine and the engine are controlled based upon the torque output from the electric machine and the operator torque request.

BRIEF DESCRIPTION OF THE DRAWINGS

One or more embodiments will now be described, by way of example, with reference to the accompanying drawings, in which.

DETAILED DESCRIPTION OF A PREFERRED EMBODIMENT

Figure 1:
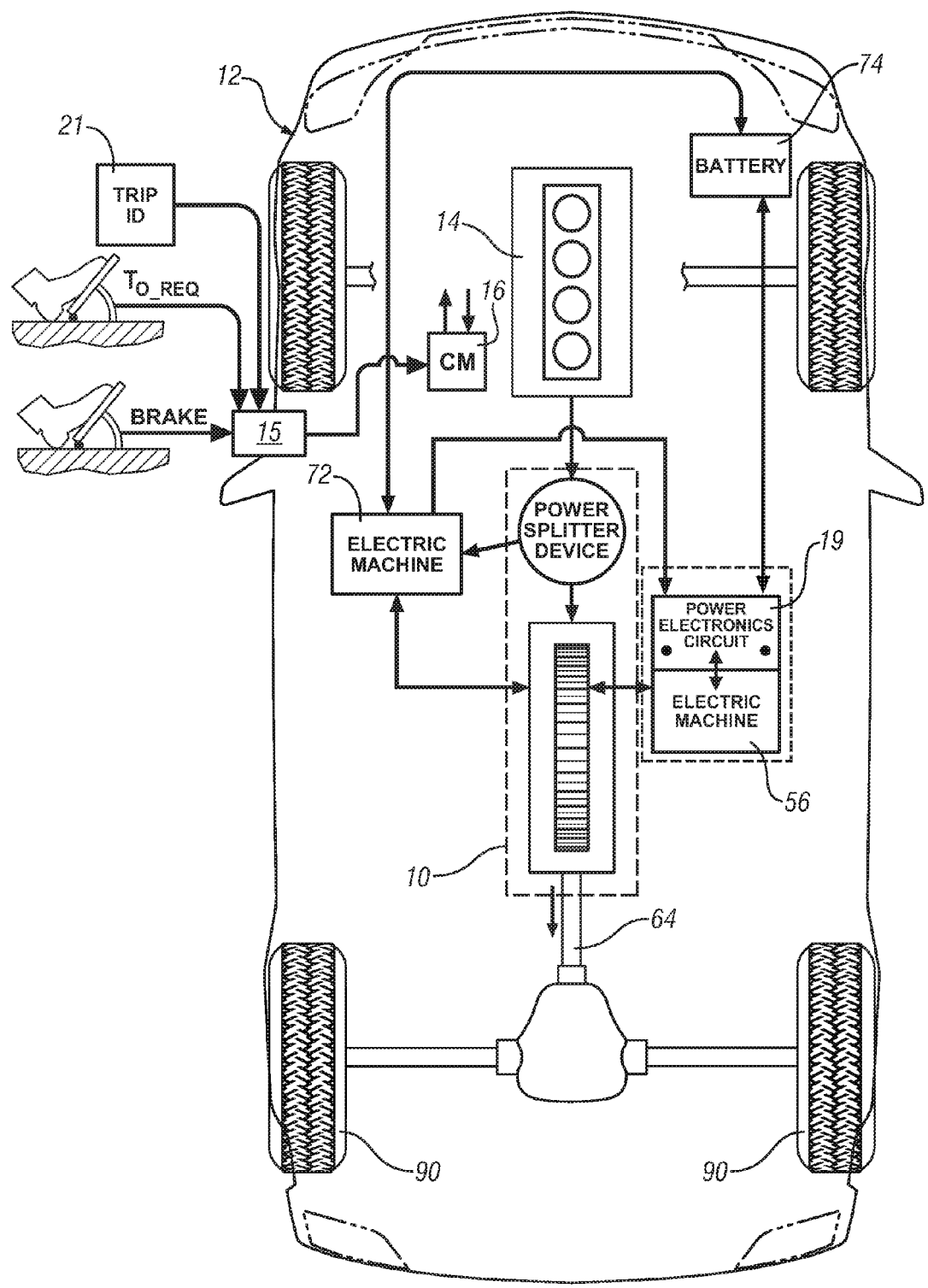
FIG. 1 is a schematic diagram of an exemplary powertrain, in accordance with the present disclosure.

Referring now to the drawings, wherein the showings are for the purpose of illustrating certain exemplary embodiments only and not for the purpose of limiting the same, FIG. 1 depicts a vehicle system 12 which has been constructed in accordance with an exemplary embodiment. The vehicle comprises an internal combustion engine 14, electro-mechanical transmission 10, and driveline adapted to transmit tractive torque to vehicle wheels 90, the operation of which is controlled by a control module (CM) 16. An electric power system comprises electric power components including electric machines, an electrical power storage device 74, e.g. battery, and power electronics circuit 19. The electric machines in this embodiment comprise motor/generator devices comprising a first electric machine 56 and a second electric machine 72. The electric machines preferably comprise three-phase AC machines, and include a stator, a rotor, and a resolver assembly. The motor stator for each machine is grounded to an outer portion of the transmission case, and includes a stator core with coiled electrical windings extending therefrom. The first and second electric machines operate as electric motors to convert electric energy to mechanical torque, and operate as electric generators to convert mechanical torque to electrical energy, depending upon the operating conditions and control strategy executed by the CM 16. The power electronics circuit 19 comprises motor control modules, each which transmits electrical power between the battery 74 and the electric machines 56, 72 by transfer conductors. Electrical power is transmitted in accordance with whether battery 74 is being charged or discharged. The power electronics circuit includes power inverters and respective motor control modules configured to receive motor control commands and control inverter states therefrom for providing motor drive or regeneration functionality. The inverters comprise known complementary three-phase power electronics devices, including insulated gate bipolar transistors (IGBT) for converting DC power from the battery 74 to AC power for powering one of the electrical machines by switching at high frequencies. There is typically one pair of IGBTs for each phase of the three-phase electric machines.

The battery 74 comprises a high-voltage battery system adapted to store electrical energy and transmit electrical power to the electric machines via the power electronics circuit 19. The ESD and electric machines are electrically-operatively coupled for electric power flow therebetween. The engine, electric machines, and the electro-mechanical transmission are mechanically-operatively coupled to transmit mechanical power therebetween to transmit motive torque to the driveline via an output 64. The exemplary engine 14 comprises a multi-cylinder internal combustion engine selectively operative in several states to transmit torque to the transmission via a shaft, and can be either a spark-ignition or a compression-ignition engine.

The exemplary transmission 10 comprises an electro-mechanical device adapted to operate in one of several operating range states comprising fixed gear operation and continuously variable operation. The transmission preferably includes a power splitter device, whereby a portion input torque from the engine may be transmitted to one of the electric machines 72 to generate electric power for charging of the battery 74. The transmission 10 receives input torque from the torque-generative devices, including the engine 14 and the electric machines 56, 72, as a result of energy conversion from fuel or electrical potential stored in the battery 74. The battery 74 is high voltage DC-coupled to the power inverter device 19 via DC transfer conductors. Electrical power, measurable in current and voltage, is transmitted to and from the battery 74 in accordance with whether the battery is being charged or discharged. More detailed mechanical aspects of an exemplary electro-mechanical transmission 10 are disclosed in commonly assigned U.S. Pat. No. 6,953,409.

User interface 15 is operably connected to a plurality of devices through which the vehicle operator typically controls or directs operation of the powertrain including the transmission 10. The inputs to the user interface include an operator torque request ($T_{O\_REQ}$) via an accelerator pedal and operator brake (Brake) via a brake pedal. Additionally, there is a trip identifier device (Trip ID) 21, to provide operator input as described hereinbelow. Other operator input devices typically include a transmission gear selector, and a vehicle speed cruise control.

CM 16, preferably comprises a distributed control module system adapted to monitor the inputs from the user interface 15 and a plurality of sensing devices and execute predetermined algorithms stored therein to control actuators of the various devices to meet the operator torque request and other parameters related to performance, fuel economy, emissions, driveability, and protection of hardware, including batteries. The CM 16 provides coordinated system control of the powertrain system described herein, and is a subset of overall vehicle control architecture. The CM 16 preferably includes an engine control module, transmission control module, battery pack control module, an inverter control module, and a hybrid control module which provides supervisory control and coordination of the aforementioned control modules. Each of the aforementioned control modules communicates with other control modules, sensors, and actuators via a local area network (LAN) which allows for structured communication of control parameters and commands between the various control modules.

Each of the control modules is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6. Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

Figure 2:
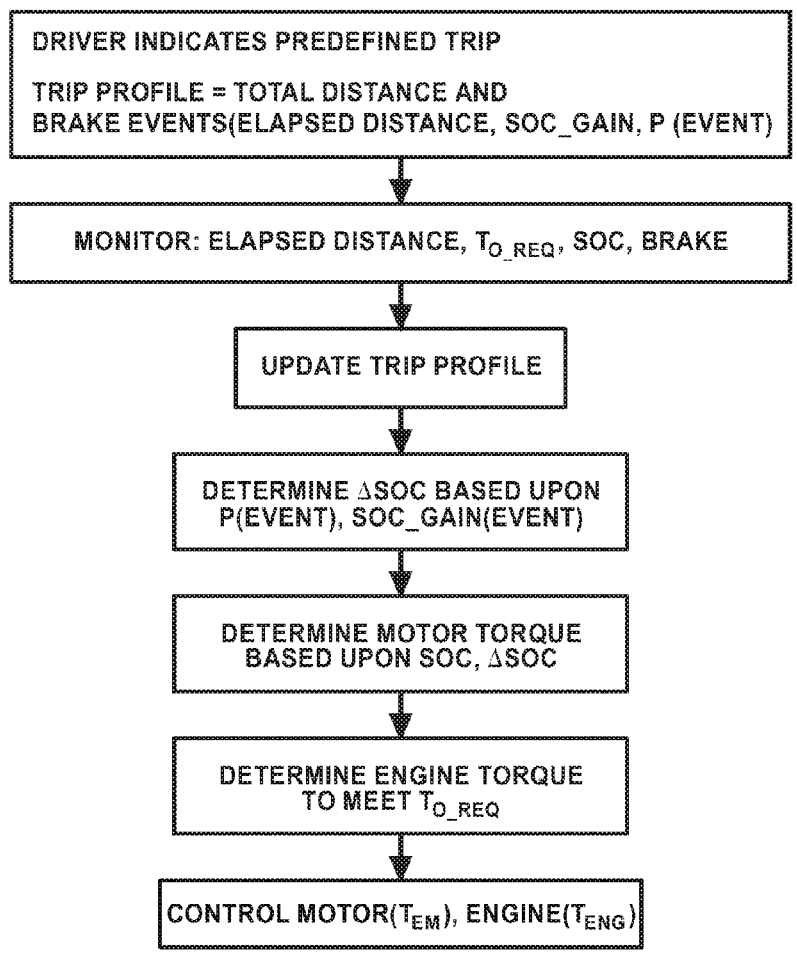
FIG. 2 is an algorithmic flowchart, in accordance with the present disclosure.

In accordance with a method, preferably executed as a computer program in the CM 16, for operating the hybrid powertrain, an embodiment of which has been described hereinabove. The method, depicted with reference to FIG. 2, includes the operator indicating occurrence of a pre-defined trip, which is to be defined or has already been defined by a trip profile. This includes determining an initial SOC and a target SOC at an end of the pre-defined trip, and a range for allowable SOC. Elapsed distance and the operator torque request, $T_{O\_REQ}$, and the operator braking request, BRAKE, are ongoingly monitored, and the SOC of the battery is regularly determined. The trip profile is updated during each iteration of the trip, including, determining occurrence of each braking event and determining a change in SOC for each of the braking events during the trip. A torque output from the electric motor is determined and controlled based upon the SOC and the change in the SOC. Torque output from the engine is determined and controlled based upon the torque output from the electric motor to meet the operator torque request. The engine and electric motor are controlled to deliver torque outputs to meet the operator torque request.

The vehicle system is equipped with the trip identifier device 21 which comprises a human-machine interface device operable to receive control inputs from the vehicle operator. The control inputs identify occurrence of a pre-defined trip, and indicate an end of the pre-defined trip through selective actuation by the operator. Alternatively, or in conjunction therewith, occurrence of the end of the pre-defined trip is recorded when the vehicle is shutdown, such as at a key-off event. The control inputs of the trip identifier device 21 preferably include a control panel comprising one or more of a touch-activated visual display screen and devices comprising operator-selectable buttons, switches, and knobs. The trip identifier device 21 is preferably located in a console between the vehicle operator and a passenger in the front seat of the vehicle, and may be an element of an on-board navigation system. There can be a plurality of pre-defined trips, selectable by the operator from a menu on the trip identifier device 21.

Each pre-defined trip comprises the trip profile, which is defined in terms of a total distance traveled for the trip and a plurality of projected braking events occurring during the trip, and optionally, a plurality of other events including acceleration, steady-state, and deceleration events. Each of the projected braking events is identified and characterized in terms of an elapsed distance from the start or initiation of the trip, a projected gain in the state of charge for the braking event (ΔSOC), and probability of occurrence of the braking event, P(event). For each braking event occurring during each iteration of the pre-defined trip, an increase or gain in SOC (SOC_GAIN(EVENT)), is determined along with the number of iterations (N), or driving cycles for the predefined trip that this braking event has occurred at or near the elapsed distance. This information is captured and stored as a part of the trip profile. The initiation of a braking event is indicated by setting a software flag (BRAKE_EVENT) when the operator applies force to the brake pedal and the vehicle is traveling above a precalibrated speed (K_SPEED_MIN) to eliminate instances where the brake is applied with the vehicle stationary. The end of each braking event is signaled by resetting the BRAKE_EVENT flag when the vehicle comes to rest with the brake pedal depressed, i.e., at zero speed, or the brake pedal is released with the vehicle moving. The elapsed distance at which the braking event starts is defined as the distance at which the operator first applies force to the brake pedal. The SOC_GAIN(EVENT) is defined as a difference between SOC at the beginning and at the end of the braking event, and is stored in computer memory along with and correlated to the elapsed distance. A minimum distance before activating the described system is also defined. There are a plurality of data points captured which correspond to N braking events occurring during each iteration of the pre-defined trip, stored in a manner which identifies the most recent iteration and the oldest iteration. A set bit indicates that the event occurred in that iteration. The information corresponding to each braking event in this algorithm is preferably stored in seven bytes of computer memory, including four bytes for elapsed distance (meters), one byte for SOC_GAIN (EVENT), and two bytes for number of occurrence of the event. As such, 100 braking events occurring in a trip requires 700 bytes of memory. The maximum number of braking events that can be stored in a trip profile is limited to some upper value based upon memory allocations in the control module.

The stored values in the trip profile are continuously updated during each iteration of the predefined trip. For an initial iteration of the pre-defined trip the event values are stored in memory without modification. On subsequent iterations, the distance at which the braking event occurred is searched inside the stored trip profile. If this distance is within a precalibrated allowed tolerance of the distance of each braking event within the stored trip profile, then a match is identified. When the total number of iterations is less than the N quantity of iterations then the distance is updated as:

$$\text{distance} = (\text{stored distance} + \text{new distance})/2 \tag{1}$$

wherein 'stored distance' is the elapsed distance stored in memory and 'new distance' is the elapsed distance for the braking event for the most recent iteration of the pre-defined trip.

Similarly, ΔSOC is updated as:

$$\Delta SOC = (\Delta SOC + SOC\_GAIN(EVENT))/2 \tag{2}$$

wherein ΔSOC is the ΔSOC stored in memory and the SOC_GAIN(EVENT) is the change in state of charge for the braking event for the most recent iteration of the pre-defined trip.

When the total number of iterations exceeds X quantity of iterations, then the distance and ΔSOC are updated using a weighting factor, as follows:

$$\text{distance} = (1-\alpha)^*\text{stored distance} + \alpha^*\text{new distance} \tag{3}$$

and $$\Delta SOC = (1-\alpha)^*\Delta SOC + \alpha^*SOC\_GAIN(EVENT) \tag{4}$$

Wherein the factor α is a precalibrated valued determined during vehicle development.

The value for the number of times each braking event occurred in the last N quantity of iterations as mentioned above is stored in the form of bit encoded values. The least significant bit indicates the most recent iteration and the most significant bit indicates the oldest stored iteration. For each iteration, this stored value is shifted left by one bit resulting in loss of the most significant bit. Then depending upon whether or not a braking event occurred at this distance a bit value of '0' or '1' is pushed to the least significant bit. With this technique the stored value falls to 0 for the braking events that have not occurred in N number of iterations. Also the stored profile is purged of any event whose value of occurrence falls to zero, thus cleaning the profile of one-time or random events during one of the iterations.

The instantaneous torque output from the electric machine is determined and controlled based upon the total SOC for the trip and the ΔSOC for an anticipated braking event occurring immediately subsequent thereto, i.e., the next occurring braking event during the pre-defined trip. The total SOC for the trip is determined based upon an initial SOC at start of the trip and a target SOC at the end of the trip, and includes the electric power that is generated during the trip. The electric power generated during the pre-defined trip comprises power generated during regenerative braking events, and power generated by charging events during ongoing powertrain operation. The power generated during regenerative braking events is based upon the predicted or anticipated braking events and associated braking torque occurring during the pre-defined trip, as previously described.

The projected gain in state of charge for a braking event, ΔSOC, is determined as follows. During each iteration of the pre-defined trip, the distance traveled from the start of the trip is calculated. When the calculated distance is within the calibratable elapsed distance of the stored distance of a braking event in the trip profile, the control module determines that the subsequent braking event is imminent. The probability of the subsequent braking event is calculated from the stored number of occurrences of this event within the most recently occurring N iterations of the pre-defined trip. The probability of occurrence of the braking event, P(event), is as follows:

$$P(\text{event}) = (\text{number of occurrences})/N \text{ iterations} \tag{5}$$

And, the projected gain in state of charge, ΔSOC, for the braking event is as follows:

$$\Delta SOC = P(\text{event})^*\text{stored } \Delta SOC^*\beta \tag{6}$$

wherein stored ΔSOC is the ΔSOC stored in memory for the specific braking event, and β is a zooming or attenuation factor, intended to weight the ΔSOC to the most recently occurring iterations of the pre-defined trip. The projected gain in the state of charge, ΔSOC, from the subsequent braking event is considered to be available to power the electric machine to provide tractive torque. Thus, tractive torque supplied from the electric machine is increased, as described. The electric machine torque, $T_{EM}$, is calculated using a hyperbolic tangent function as described below.

Figure 3:
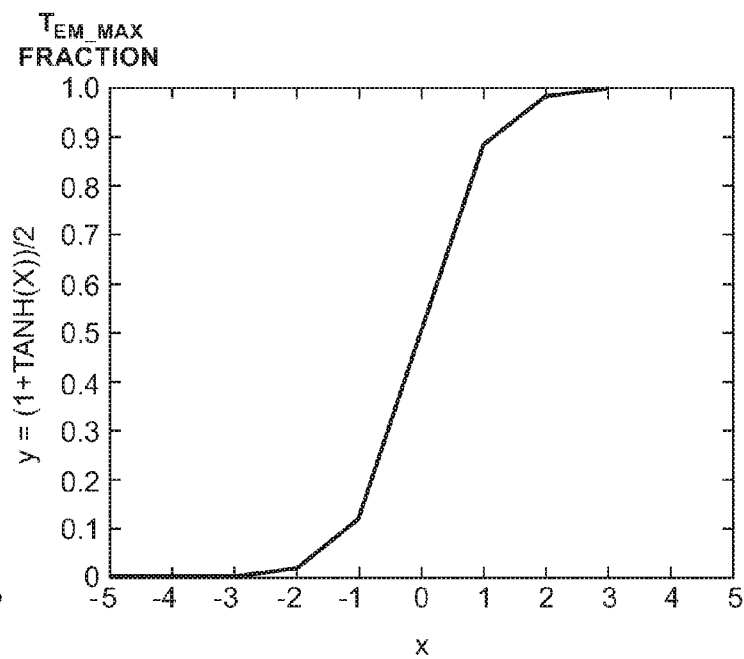
FIGS. 3 and 4 are exemplary datagraphs, in accordance with the present disclosure.

Referring now to FIG. 3, determining a percentage, or fraction, of maximum torque for the electric machine, $T_{EM\_MAX}$ at which to operate the electric machine of the system is now described. The SOC is preferably maintained within a range falling between a predetermined lower limit (SOC_LOW) and a predetermined upper limit (SOC_HIGH) which are determined in accordance with, for example, criteria based upon battery design criteria, battery life expectations, and customer satisfaction metrics. In one example of operating the system described hereinabove, values for SOC_LOW and SOC_HIGH are selected as 0.50 and 0.85 respectively, and represent normalized values for SOC. The hyperbolic tangent function has a characteristic S-shape, as depicted in FIG. 3. The hyperbolic tangent function is utilized to determine the fraction of maximum torque for the electric machine, $T_{EM\_MAX}$ that can be used, based upon SOC, such that when SOC is low the electric machine contributes a relatively minor portion of the maximum available machine torque, and when the SOC is high, the electric machine contributes a relatively major portion of the maximum available machine torque. The graph in FIG. 3 depicts tan h(x) for x=−5 to +5, wherein x=−5 corresponds to the lower limit of SOC, i.e., SOC_LOW=0.5, and x=5 corresponds to the upper limit of SOC, i.e., SOC_HIGH=0.85. The value of SOC is translated to a value of X as follows:

$$X = -5 + [(SOC - SOC\_LOW) * 10 / (SOC\_HIGH - SOC\_LOW)] \quad (7)$$

The value of Y, comprising the percentage, or fraction, of maximum torque for the electric machine, $T_{EM\_MAX}$ is then determined as follows:

$$Y = (1 + \tan h(X))/2; \quad (8)$$

And, the requested machine torque is determined as follows:

$$T_{EM}(\text{requested}) = Y * T_{EM\_MAX} \quad (9)$$

Thus, when the SOC is at or near SOC_HIGH, the requested machine torque is the maximum torque for the electric motor, $T_{EM\_MAX}$. Conversely, when SOC is at or near SOC_LOW, the requested machine torque is zero.

The required engine torque, $T_{ENG}$ is determined as a difference between the operator torque request, and the requested electric machine torque, as follows:

$$T_{ENG} = T_{O\_REQ} - T_{EM}(\text{requested}) \quad (10)$$

When the projected gain in state of charge for the braking event, ΔSOC, is not factored into the calculations, then at any given point in time, for a given state of charge, X, the percentage of maximum machine torque is determined as follows:

$$Y = (1 + \tan h(X))/2 \quad (11)$$

When projected gain in state of charge for a braking event, ΔSOC is factored into the calculations, represented as dx, then the percentage of maximum machine torque is as follows:

$$Y = (1 + \tanh(X + dx))/2 \quad (12)$$

wherein:

$$X + dx = -5 + \frac{((SOC + \Delta SOC) - SOC\_LOW) \times 10}{(SOC\_HIGH - SOC\_LOW)} \quad (13)$$

This permits a greater torque contribution from the electric machine when there is a high probability of recharging occurring in the near future from a projected braking event, with charge recovery occurring during the projected braking event as a result of regenerative braking. Similarly, the torque contribution from the electric machine is reduced when the probability of recharging occurring in the near future from projected braking event is low.

The control module controls the torque output from the electric machines based upon the requested electric motor torque. The control module is operative to control the torque output from the engine based upon the operator torque request and the torque output from the electric machines, taking into account response times and system lags in the engine and the electric motors. In the embodiment depicted, the system is operative to selectively employ one of the electric machines, i.e., electric machine 72, to charge the battery 74 during ongoing operation. With implementation of this system, the control module can reduce the split of engine power to the electric machine used for charging the battery 74, thus improving engine efficiency, and potentially improving fuel economy for the trip.

Figure 4:
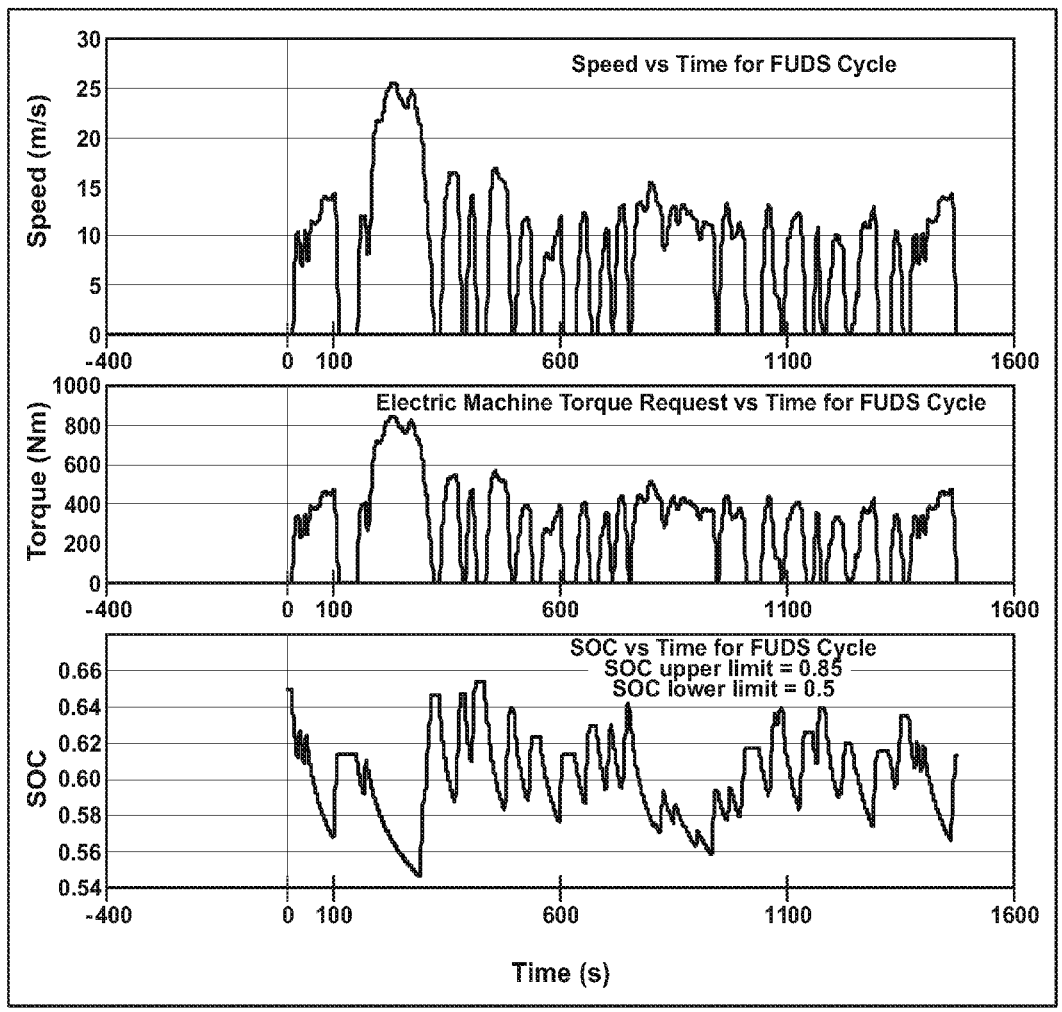

Referring now to FIG. 4, datagraphs depict results of a simulation executed to determine effectiveness of the control of the present disclosure. The first portion of the graph depicts vehicle speed based upon elapsed time, wherein the vehicle is operated over a predefined cycle having a plurality of braking events. The cycle depicted herein consists of a federal urban driving cycle (FUDS), with the preferred SOC for the system ranging between SOC_LOW=0.5 and SOC_HIGH=0.85. The value of other calibrations used in the simulation included: number of iterations, N, of the predefined trip equal to 10; precalibrated allowed tolerance of distance of each braking event equal to 0.0 m; a minimum distance equal to 100 m; K_SPEED_MIN equal to 4 m/s; and attenuation factor β equal to 10. The torque output of the electric machine, $T_{EM}$, and the SOC are plotted, and the results indicate that the algorithm is charge-sustaining with a variation of SOC well within the allowed range between 0.85 and 0.50, having, in the system described, a variation in SOC between 0.65 and 0.55.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method to operate a powertrain, the powertrain comprising an internal combustion engine and an electric machine mechanically-operatively coupled to an electro-mechanical transmission to transmit mechanical power to a driveline and the electric machine electrically-operatively coupled to an energy storage system for electric power flow therebetween, the operation of which is controlled by a control module, the method comprising:
utilizing the control module for determining occurrence of a pre-defined trip;
utilizing the control module for monitoring an operator torque request, an operator braking request, and a state of charge of the energy storage system;
utilizing the control module for determining a projected gain in the state of charge of the energy storage system as a result of regenerative braking for a braking event occurring during the pre-defined trip;
utilizing the control module for determining a requested torque output from the electric machine based upon the projected gain in the state of charge of the energy storage system as a result of regenerative braking for the braking event; and utilizing the control module for controlling torque outputs from the electric machine and the engine based upon the requested torque output from the electric machine and the operator torque request.

2. The method of claim 1, wherein the braking event occurring during the pre-defined trip comprises an elapsed distance, a gain in the state of charge, and a probability of occurrence.

3. The method of claim 2, wherein the probability of occurrence of the braking event is determined based upon occurrences of the braking event during a plurality of previous iterations of the pre-defined trip.

4. The method of claim 2, wherein the projected gain in the state of charge is determined based upon gains in the state of charge of the energy storage system during previous iterations of the pre-defined trip at the elapsed distance for the braking event.

5. The method of claim 4, wherein the projected gain in the state of charge of the energy storage system is further determined based upon the probability of occurrence of the braking event.

6. The method of claim 1, further comprising determining the torque output from the electric machine based upon the state of charge.

7. The method of claim 1, wherein determining occurrence of the pre-defined trip comprises determining the operator indicating the occurrence via a control input to a trip identifier device.

8. The method of claim 1, comprising updating the pre-defined trip during successive iterations of the pre-defined trip.

9. The method of claim 8, wherein the pre-defined trip comprises a total distance traveled, and a plurality of braking events.

10. A method to control electric power flow in a powertrain comprising an internal combustion engine and an electric machine mechanically-operatively coupled to an electro-mechanical transmission operative to transmit mechanical power flow to a driveline, the electric machine electrically-operatively coupled to an energy storage system for electric power flow therebetween, the operation of which is controlled by a control module; the method comprising:
utilizing the control module for determining occurrence of a pre-defined trip;
utilizing the control module for monitoring an operator torque request, an operator braking request, and a state of charge of the energy storage system;
utilizing the control module for determining a projected gain in the state of charge of the energy storage system as a result of regenerative braking for a subsequent braking event occurring during the pre-defined trip; and
utilizing the control module for determining a requested torque output from the electric machine based upon the projected gain in the state of charge of the energy storage system as a result of regenerative braking for the subsequent braking event and controlling torque output from the electric machine prior to the subsequent braking event based upon the requested torque output.

11. The method of claim 10, wherein the braking event is characterized by an elapsed distance, a gain in the state of charge, and a probability of occurrence of the braking event.

12. The method of claim 11, wherein the probability of occurrence of the braking event is determined based upon occurrences of the braking event during a plurality of previous iterations of the pre-defined trip.

13. The method of claim 11, wherein the projected gain in the state of charge of the energy storage system for a subsequent braking event occurring during the pre-defined trip is determined based upon the probability of occurrence of the subsequent braking event and gains in the state of charge during a plurality of previous iterations of the pre-defined trip.

14. The method of claim 10, further comprising:
determining a torque output from the electric machine based upon the state of charge; and
determining and controlling torque output from the internal combustion engine based upon the torque output from the electric machine and the operator torque request.

15. A method for managing torque to an electro-mechanical transmission from an electric machine mechanically-operatively coupled thereto to transmit mechanical power to a driveline, the electric machine electrically-operatively coupled to an energy storage system for electric power flow therebetween, the operation of which is controlled by a control module, the method comprising:
utilizing the control module for determining occurrence of a pre-defined trip, the pre-defined trip comprising a total distance traveled, and a plurality of projected braking events;
utilizing the control module for monitoring an operator braking request, and a state of charge of the energy storage system;
utilizing the control module for determining a projected gain in the state of charge of the energy storage system as a result of regenerative braking for a subsequently occurring braking event; and
utilizing the control module for determining a requested torque output from the electric machine based upon the projected gain in the state of charge of the energy storage system as a result of regenerative braking for the subsequently occurring braking event and controlling torque output from the electric machine to the electro-mechanical transmission based upon the requested torque output.

16. The method of claim 15, further comprising:
monitoring an operator torque request; and
managing torque input to the electro-mechanical transmission from an internal combustion engine mechanically-operatively coupled thereto to transmit mechanical power to the driveline based upon the torque output from the electric machine and the operator torque request.

17. The method of claim 15, wherein each of the projected braking events is defined based upon an elapsed distance, a projected gain in state of charge of the energy storage system, and a probability of occurrence.

18. The method of claim 17, wherein the probability of occurrence of the projected braking events is determined based upon occurrences of projected braking events during a plurality of previous iterations of the pre-defined trip.

19. The method of claim 18, wherein the projected gain in the state of charge of the energy storage system is determined based upon gains in the state of charge of the energy storage system during previous iterations of the pre-defined trip.

20. The method of claim 19, wherein the projected gain in the state of charge of the energy storage system is further determined based upon the probability of occurrence of the braking event.

* * * * *